United States Patent [19]

Armitage

[11] 4,119,388
[45] Oct. 10, 1978

[54] MACHINE TOOL

[76] Inventor: Harry J. Armitage, 1546 Cavitt Rd., Monroeville, Pa. 15146

[21] Appl. No.: 809,304

[22] Filed: Jun. 23, 1977

[51] Int. Cl.² .................. B23B 39/00; B23B 51/08
[52] U.S. Cl. ........................ 408/111; 408/1 R; 408/25; 408/234; 408/705; 269/71
[58] Field of Search .............. 408/111, 234, 72, 705, 408/25, 26

[56] References Cited

U.S. PATENT DOCUMENTS

| | | | |
|---|---|---|---|
| 1,809,188 | 6/1931 | Barnes | 408/234 |
| 1,936,384 | 11/1933 | Davis | 408/234 |
| 2,170,054 | 8/1939 | Jeschor | 408/111 |
| 2,432,943 | 12/1947 | Shaw, Jr. | 408/111 |
| 2,774,260 | 12/1956 | Schraub | 408/111 |
| 2,831,386 | 4/1958 | Woytych | 408/234 |
| 2,903,917 | 9/1959 | Carlstedt | 408/234 |
| 3,075,415 | 1/1963 | Dabringhaus | 408/59 |
| 3,530,743 | 9/1970 | Jacobson | 408/111 |
| 3,530,744 | 9/1970 | Jacobson | 408/186 |

Primary Examiner—Harrison L. Hinson

Attorney, Agent, or Firm—Hymen Diamond

[57] ABSTRACT

A horizontal boring mill for machining work at a high rate. The boring mill includes a massive boring bar which carries intermediate its end the boring-tool holder from which boring tools extend radially. The boring bar is rotated by a first drive of sufficient power to enable the boring tool to take a deep cut in the work at a high rate. The boring bar is rotatable on bearings of substantial area; a bearing between the first drive and the bar and bearings on each side of the work. The bar, the first drive and the bearing between the first drive and the bar are moved along the bed of the boring mill by a second drive so that the boring tool engages and cuts the work. The other bearings are secured to the bed and the bar is moved through them. Each bearing on each side of the work carries a facing tool which is rotatable by the bar as the bar is rotated but is not movable with the bar. These bearings may be adjustably secured along the bed so that the facing tool is in position to face the ends of the work. The work may be faced at both ends while it is being bored.

21 Claims, 5 Drawing Figures

MACHINE TOOL

BACKGROUND OF THE INVENTION

This invention relates to machine tools and has particular relationship to boring mills and more specifically to horizontal boring mills. The particular subject matter of this invention is herein described as a generally horizontal boring mill. The expression "generally horizontal boring mill" means a boring mill which may be horizontal or may be inclined at a small angle, 10° to 30° to the horizontal. Such an inclined boring mill, in which the work is mounted so that the boring tool moves generally downwardly through the bore as the milling operation progresses, has the advantage that the chips are removed by gravity. While the description of this invention emphasizes the generally horizontal boring mill, this invention is applicable to boring mills of other types. To the extent that this invention is so applicable, such practice of the invention is within the scope of this application or of any patent which may issue on or as a result thereof.

Modern industry and technology frequently requires that massive structures of high toughness be bored. Typically, it is necessary to bore a cylinder of 4340 heat-treated steel whose length may vary between 4 feet and 12 feet or longer and whose outside diameter may be as high as 6 feet or larger. The bores to be produced in these cylinders may vary between 22 inches or less and 50 inches or more. In the interest of economy, it is necessary that these structures be bored at a high rate. Machine tools for accomplishing this purpose are not available. Machine tools for boring structures of the dimensions described above mounted vertically, even if they were available, would require a building of unusual height or an excavation under the floor of a building. In addition, the jigs required to support the work would necessarily be massive. To take the cuts at a high rate the cutting tools must be massive and high-power massive drives are demanded. It is estimated that a machine tool for boring such work positioned vertically would cost currently about $2 million.

It is accordingly an object of this invention to provide a machine tool of relatively low cost for boring massive structures of high toughness material at a high rate.

It has been realized that the difficulties and costs of boring massive structures may to an extent be reduced by boring the structures in generally horizontal position. This practice does not demand an unusually high building or a building having an excavation under its floor. The difficulties of mounting the work and the tool and its drive are also reduced. However, satisfactory machine tools for this purpose are not available in accordance with the teachings of the prior art. Typical of such prior art U.S. Pat. McFerren No. 3,131,584 and Shaw No. 2,432,943. McFerren discloses a ram movable along a track carrying a cutting tool at its end. Such a machine tool is incapable of taking a deep cut and even when taking a moderate cut tends to stutter or chatter and vibrate violently. Shaw discloses a boring mill in which a tool is moved along a bar by a rotating screw. This structure is inherently not sufficiently sturdy for rapid boring of high-toughness material.

It is accordingly an object of this invention to overcome the deficiencies, disadvantages and drawbacks of the prior art and to provide a machine tool, particularly a generally horizontal boring mill, for boring massive work of high-toughness, high strength material such as tool steel or rolling mill sleeves at a high rate and also applicable to the boring of soft material such as graphite iron or chills used for roll manufacture.

SUMMARY OF THE INVENTION

In accordance with this invention there is provided a generally horizontal boring mill including a massive boring bar which is supported on bearings of substantial area generally horizontally on the bed of the boring mill movably along the bed. A massive cutting-tool head from whose rim cutting tools extend is firmly secured to the boring bar intermediate its ends. The bar is rotatable by a drive of such power as to enable the cutting tools to take a deep cut. The boring bar and the cutting-tool head and the drive are advanced along the bed and as the boring bar is advanced, the cutting tool engages the work, which is also supported on the bed, machining the work as required. The bearings of substantial area on which the boring bar is supported include a bearing at the driven end of the boring bar movable with the bar and fixed bearings on opposite sides of the work. A facing head carrying facing tools is supported on each of the fixed bearings for facing the ends of the work. These end facing tools are rotated by the boring bar but do not move along the bed with the bar so that the boring and facing may proceed simultaneously.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DETAILED DESCRIPTION OF EMBODIMENT

Figure 1:
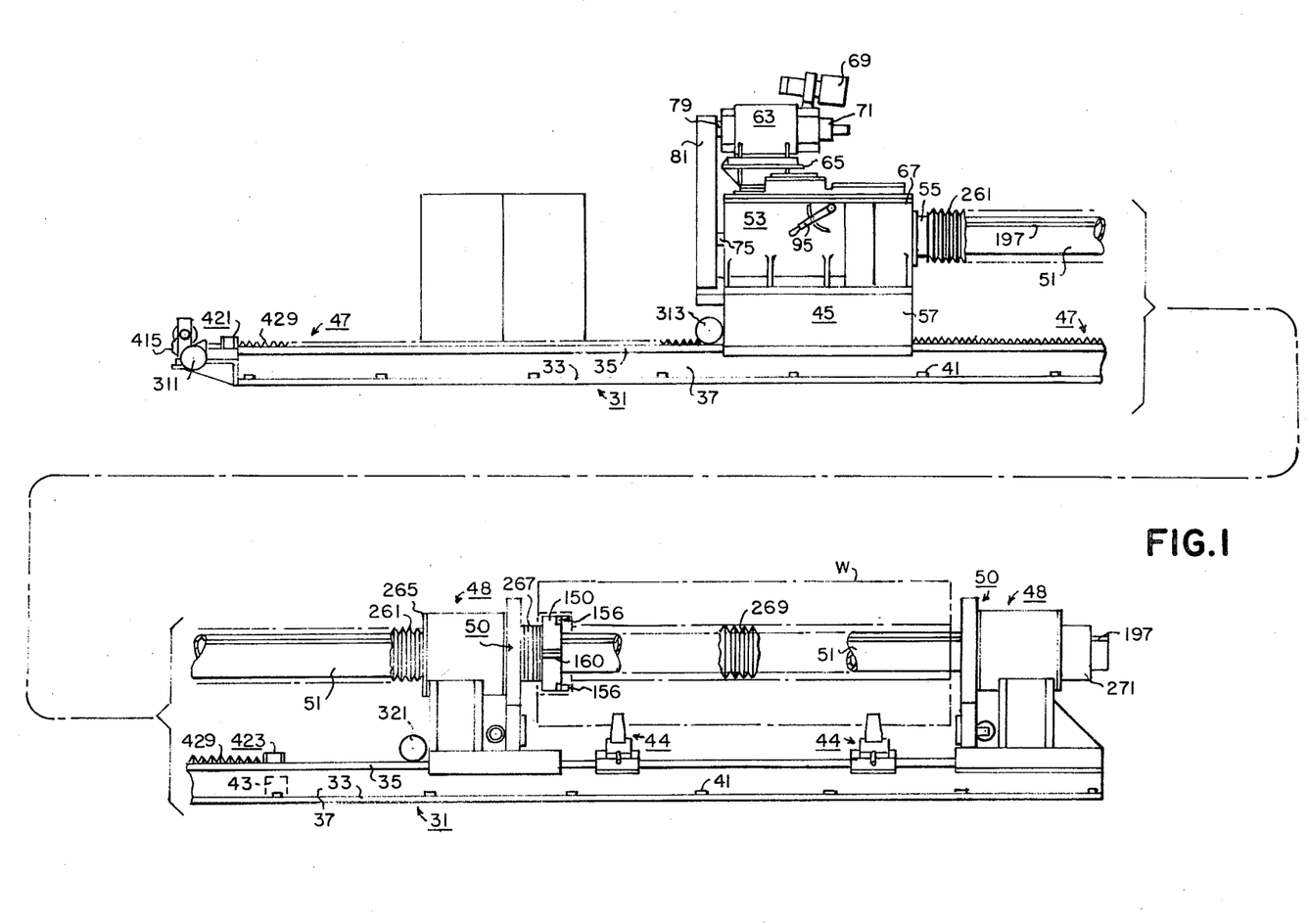
FIG. 1 is a view in side elevation of a generally horizontal boring mill in accordance with this invention.
Figure 2:
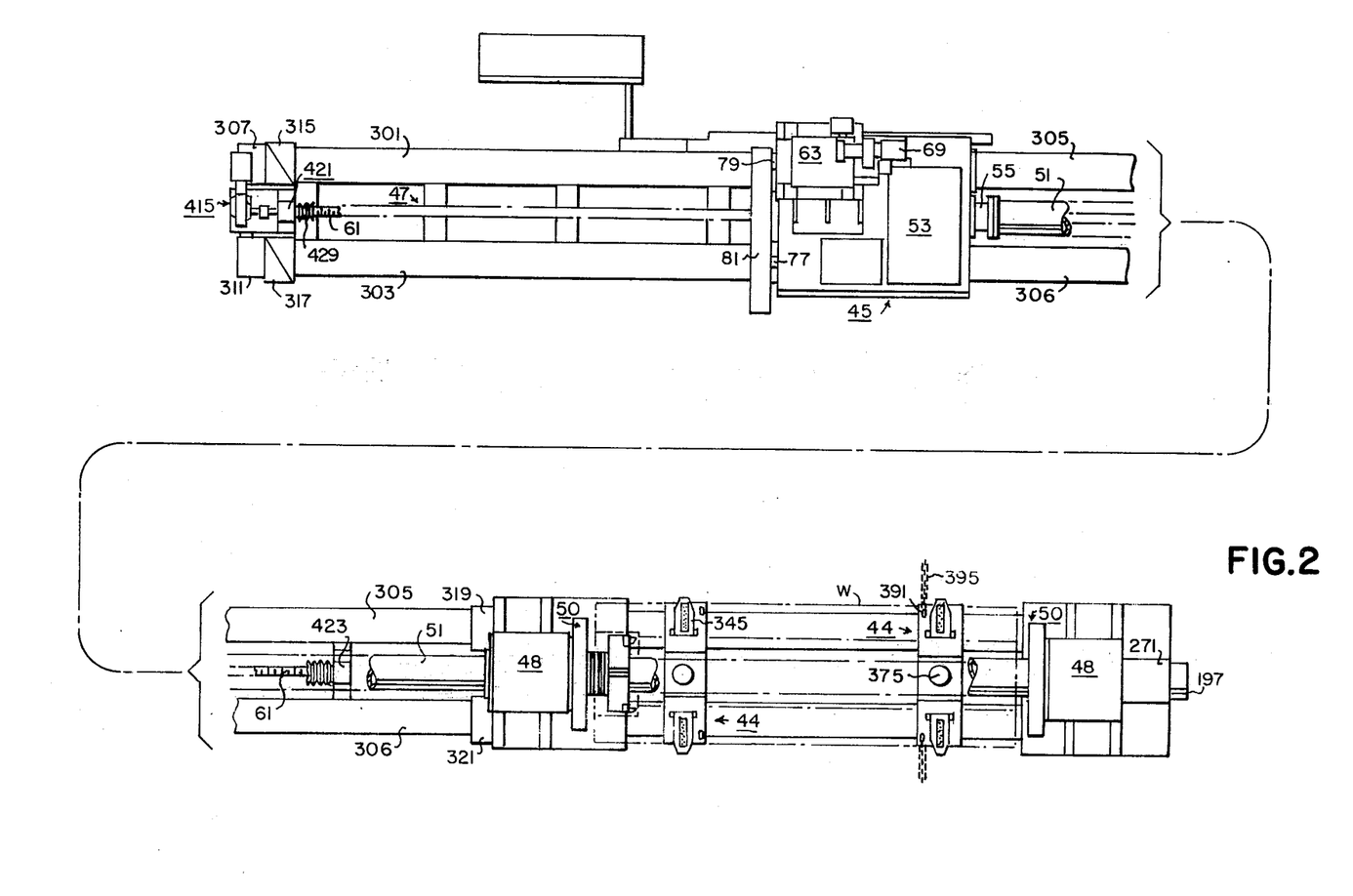
FIG. 2 is a plan view of the apparatus shown in FIG. 1 but with the bellows removed from the boring bar and a portion of the boring bar broken away.
Figure 3:
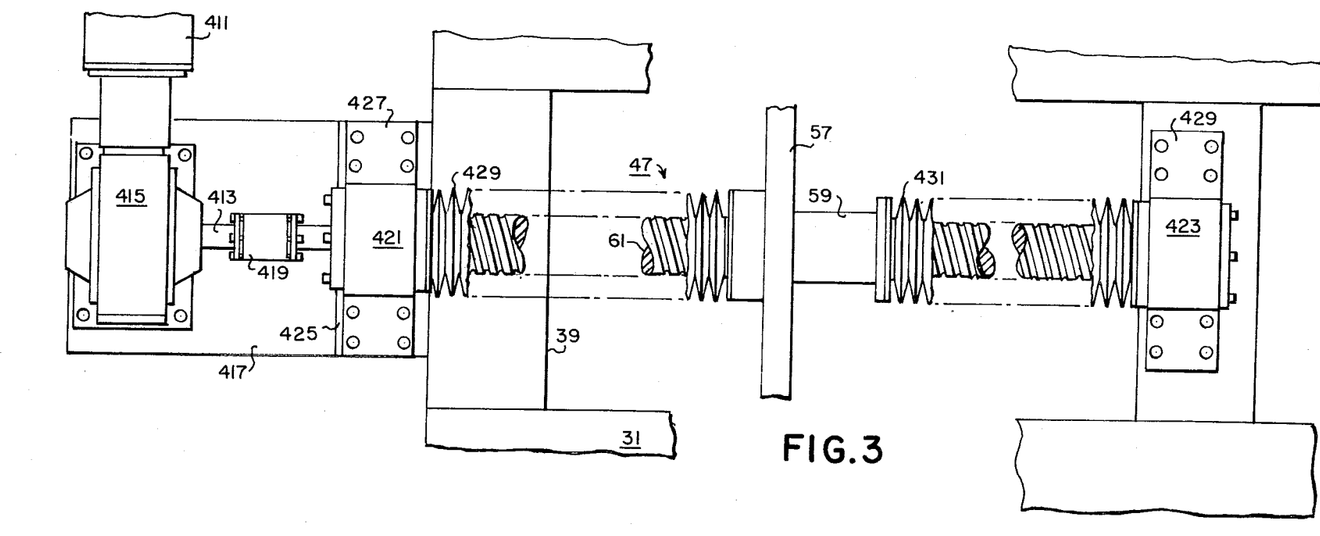
FIG. 3 is a plan view showing the drive for advancing the boring bar and its drive along the base of the boring mill.
Figure 4:
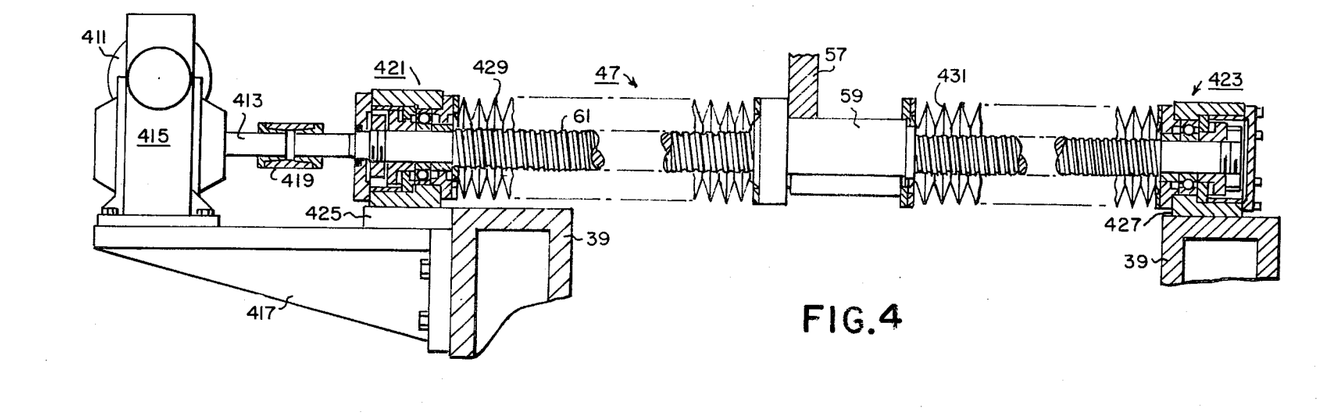
FIG. 4 is a view in side elevation of the drive shown in FIG. 3 with parts sectioned for a better understanding of this invention.

The apparatus shown in the drawings is a generally horizontal boring mill and includes a horizontal bed 31 (FIGS. 1 and 2) formed, as an integral structure, of a base 33 and ways 35 interconnected by webs 37 and cross webs 39 (FIGS. 3, 4). For a boring mill of great length, the bed 31 is in a plurality of sections which are bolted together. The base 33 is provided with levelling screws 41 and has bores 43 so that it may be bolted to the floor on which the mill is seated. The work W, shown in broken lines, is mounted on work support mechanism 44 which is bolted to the bed 31.

The apparatus, in addition to the bed 31 and work support mechanism 44, includes a boring unit 45 slideable along the ways 35, an advancing unit 47 for advancing or moving the boring unit along the ways, external bearing units 48 (FIG. 1) for the boring unit, and facing heads 50 mounted on the bearing units 48. The boring unit 45 includes a massive boring bar 51. This boring bar 51 is hollow, typically having an outside diameter of 16 inches and an inside diameter of 7 inches. In taking a deep cut the boring bar 51 is subjected to high torsional stress and it must be capable of withstanding this stress. Typically, the boring bar 51 is composed of 4340 alloy steel, heat treated and chromium plated.

The boring-bar unit 45 also includes a head stock 53 (FIG. 2) having a spindle 55. The spindle 55 is connected to the boring bar 51 so as to rotate the boring bar when it is driven. The head stock 53 is supported on a riser 57 which carries a ball nut 59 (FIG. 4) meshing with a ball screw 61 of the advancing unit 47. The head stock 53 is supported slideably along the ways 35. The spindle 55 and through it the boring bar 51 are driven by a drive including a high power motor 63. Typically, the motor 63 is a 100 horse-power motor. The motor 63 is securely mounted on a bracket 65 which is secured to the top of the casing 67 containing the head stock 53. A blower 69 is provided for cooling the motor 63. The motor 63 has a tachometer 71 providing a signal, dependent on the speed of the motor, to a control (not shown) for the apparatus.

Figure 5:
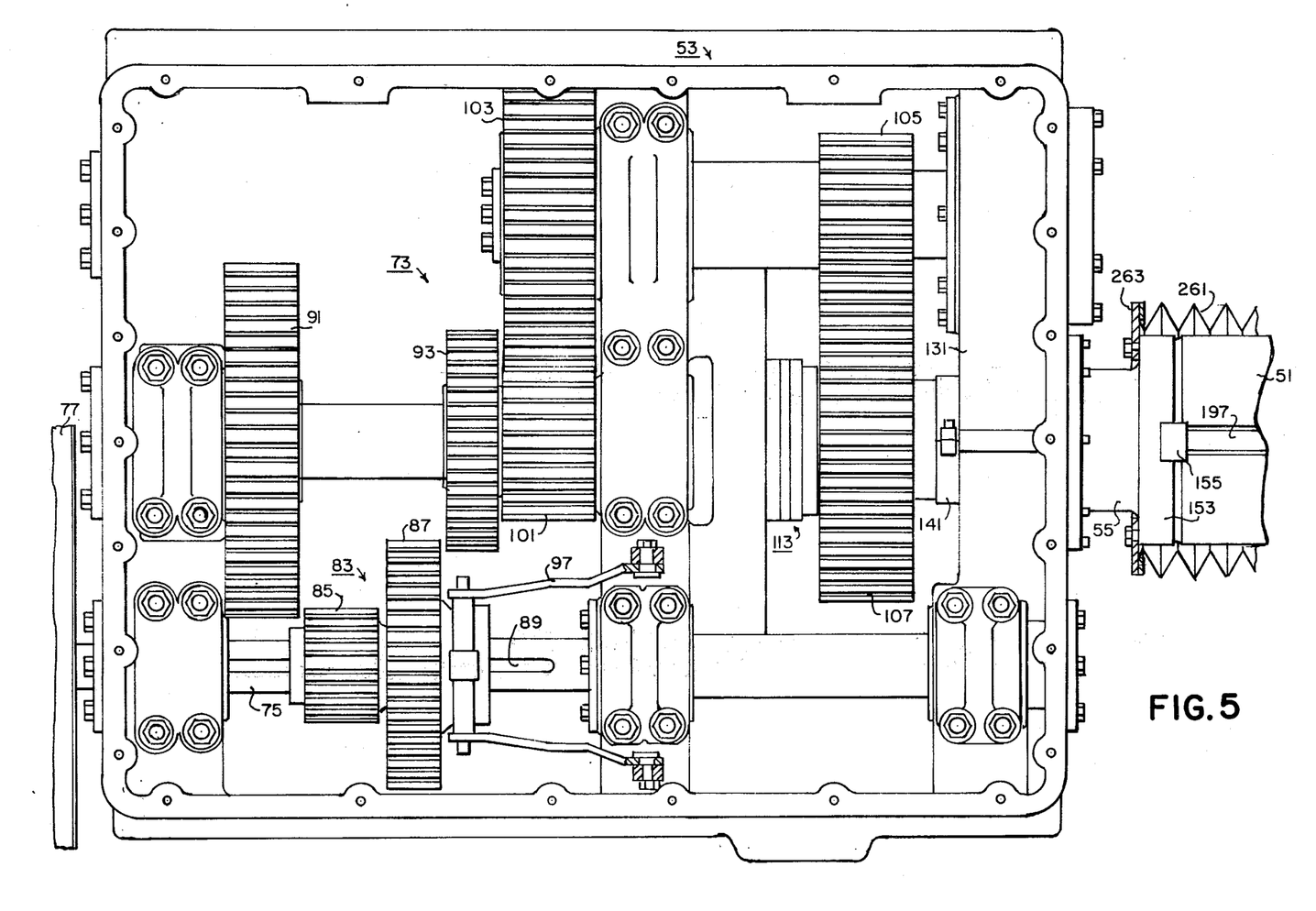
FIG. 5 is a plan view showing the gear train interconnecting the drive motor and the spindle through which the boring bar is rotated in the boring mill shown in FIG. 1.

The motor 63 drives the spindle 55 through a gear train 73 (FIG. 5). The driven shaft 75 of the gear train 73 carries a pulley 77 (FIG. 2) connected to a pulley (not shown) on the shaft 79 of motor 63 through belt 81 (FIGS. 1 and 2) such as a poly-v-belt, a timing or V belt or the like. The belt 81 drives the shaft 75 at reduced speed. The spindle 55 is rotatable at a plurality of speeds. For this purpose a pinion unit 83 (FIG. 5) is provided. This pinion unit 83 includes a plurality of pinions 85 and 87 and is slideable in a slot 89 in a shaft 75, so that either pinion 85 meshes with a larger gear 91 to drive the spindle 55 at a lower speed or pinion 85 meshes with a smaller gear 93 to drive the spindle 55 at a higher speed. The pinion unit 83 is actuated to slide in slot 89 by a shift lever 95 (FIG. 1) which operates through a yoke 97. Whether pinion 85 meshes with gear 91 or pinion 87 meshes with gear 93, the speed is further reduced by gears 101, 103, 105, 107 (FIG. 5). The gear 107 is secured to spindle 55 through a key in keyway 109.

Figure 6:
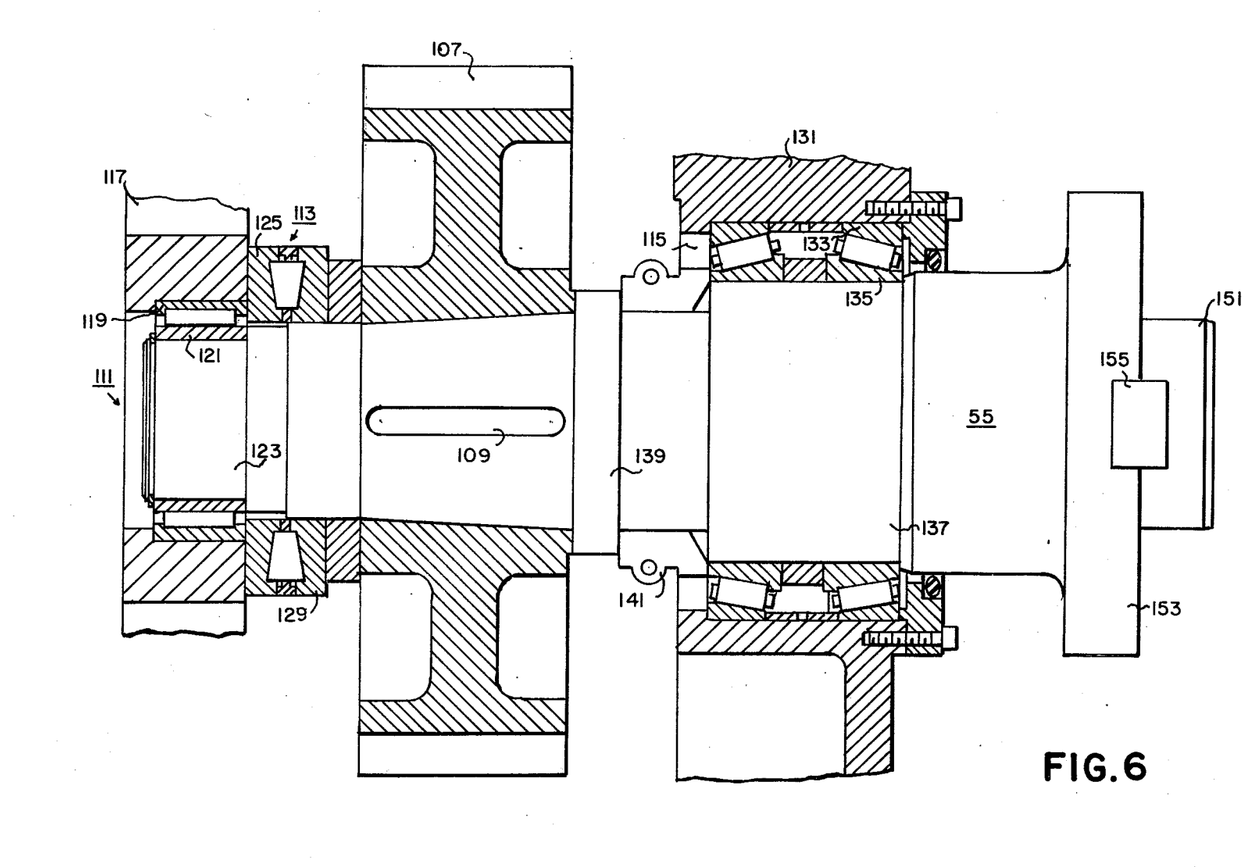
FIG. 6 is a view in longitudinal section with parts unsectioned for clarity the boring-bar spindle assembly.

The spindle 55, and with it the boring bar 51, is rotatably supported in bearings (FIG. 6) including an end bearing 111, a thrust bearing 113 and an intermediate bearing 115. The end bearing 111 is a roller bearing in bearing housing 117 having fixed race 119 and rotating race 121 secured to the end 123 of spindle 55. The thrust bearing 113 is a conical bearing including fixed race 125 and rotating race 129 secured to the spindle 55. The intermediate bearing 115 is a roller bearing in bearing housing 131 and includes fixed race 133 and rotating race 135 secured to the spindle 55. The spindle 55 is stepped to provide for the mounting of the various bearings and other parts. Between the shoulder of step 137, on which the intermediate race 135 is mounted, and the shoulder of an adjacent projection 139 of the spindle 55, a yoke 141 is provided which serves as a spacer between race 135 and the shoulder of projection 139.

The spindle 55 has a pilot 151 at its outer end (FIG. 6) for positioning the boring bar 51 (FIG. 5). A projection 153 extends inwardly from the pilot 151. This projection carries a key 155 by means of which the boring bar 151 is keyed to the spindle 55.

Figure 13:
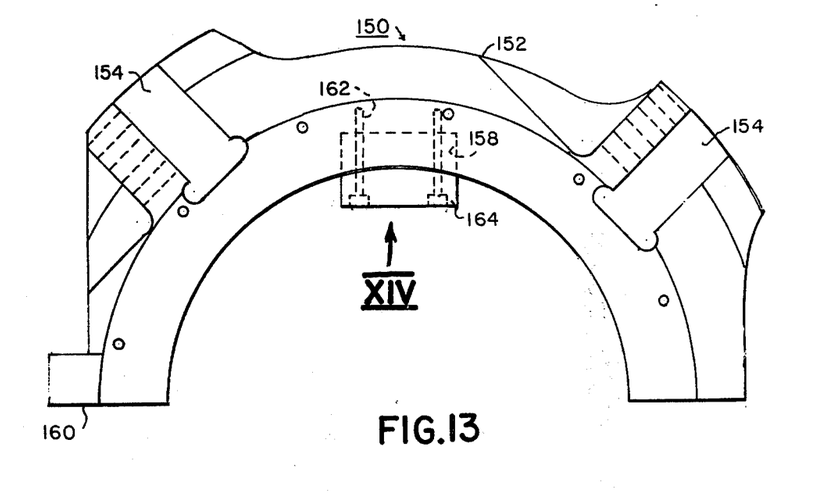
FIG. 13 is a view in side elevation of one of like sections of a tool holder included in apparatus in accordance with this invention.
Figure 14:
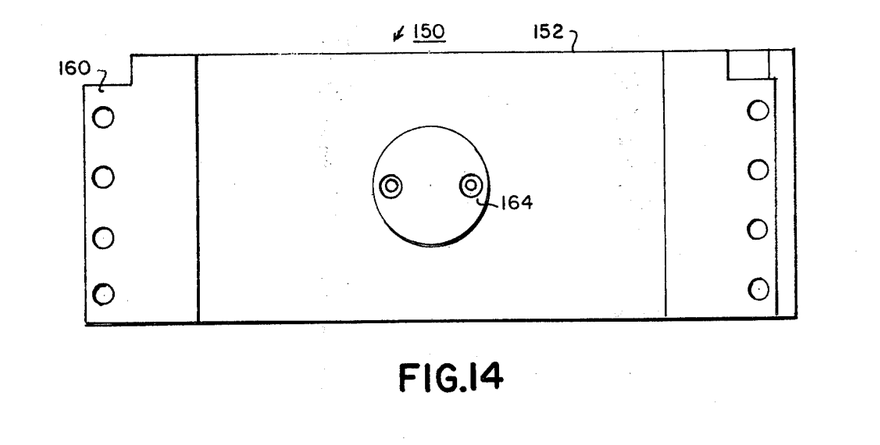
FIG. 14 is a view in end elevation as seen from the direction of arrow XIV of this section.

The boring bar unit 45 also includes a tool holder 150. The tool holder 150 is formed in a plurality, usually two, parts 152 (FIGS. 13, 14) which are clamped about, and keyed to, the boring bar 51. Each part 152 is in the form of a semicircular ring having generally cylindrical seats 154 for the tools 156 (FIG. 2). Each part 152 has a flange 160. Typically, there are two seats 154 in each part 152, each spaced 45° from an end of the part. A groove is provided in the periphery of part 152 adjacent each seat 154 for inserting bolts for securing the tool 156. Centrally each part 152 is provided with a circular hole 158 in which a pin or key 164 is secured by bolts (not shown) which screw into tapped holes 162 at the base of the hole 158. This key extends into a circular hole, not shown, in the boring bar 51 to assure that the tool holder 150 is firmly secured to, and rotatable with, the boring bar. The parts 152 are mounted on the boring bar 51 with the pins or keys 164 engaged in the holes (not shown) in the boring bar and their flanges 160 abutting. The parts 152 are bolted together by bolts passing through the flanges.

The tool holder 150 is composed typically of steel or iron and it is massive. Its width is typically 9 inches. The diameter from the end of a tool seat 154 to the end of an opposite tool seat varies typically from about 22 inches for boring a 22-inch bore to 39 inches for boring a bore having a diameter between 39 and 50 inches. The inside diameter of the tool holder is typically 16 inches for a typical 16-inch boring bar.

Each external bearing unit 48 includes a bearing-housing support 161 (FIGS. 7-10). This support 161 is cast as an integral structure and includes an annular member 163, connected through vertical webs 165 to a base 167. There is also a gusset 169 for strenthening the support 161. The support 161 is slideable along the ways 35 and may be clamped securely to the ways 35 at a desired position along the ways by clamps 171 (FIG. 9) secured by clamping bolts 173. The support 161 is positioned by a gib 175 and a screw gib 177.

Figure 7:
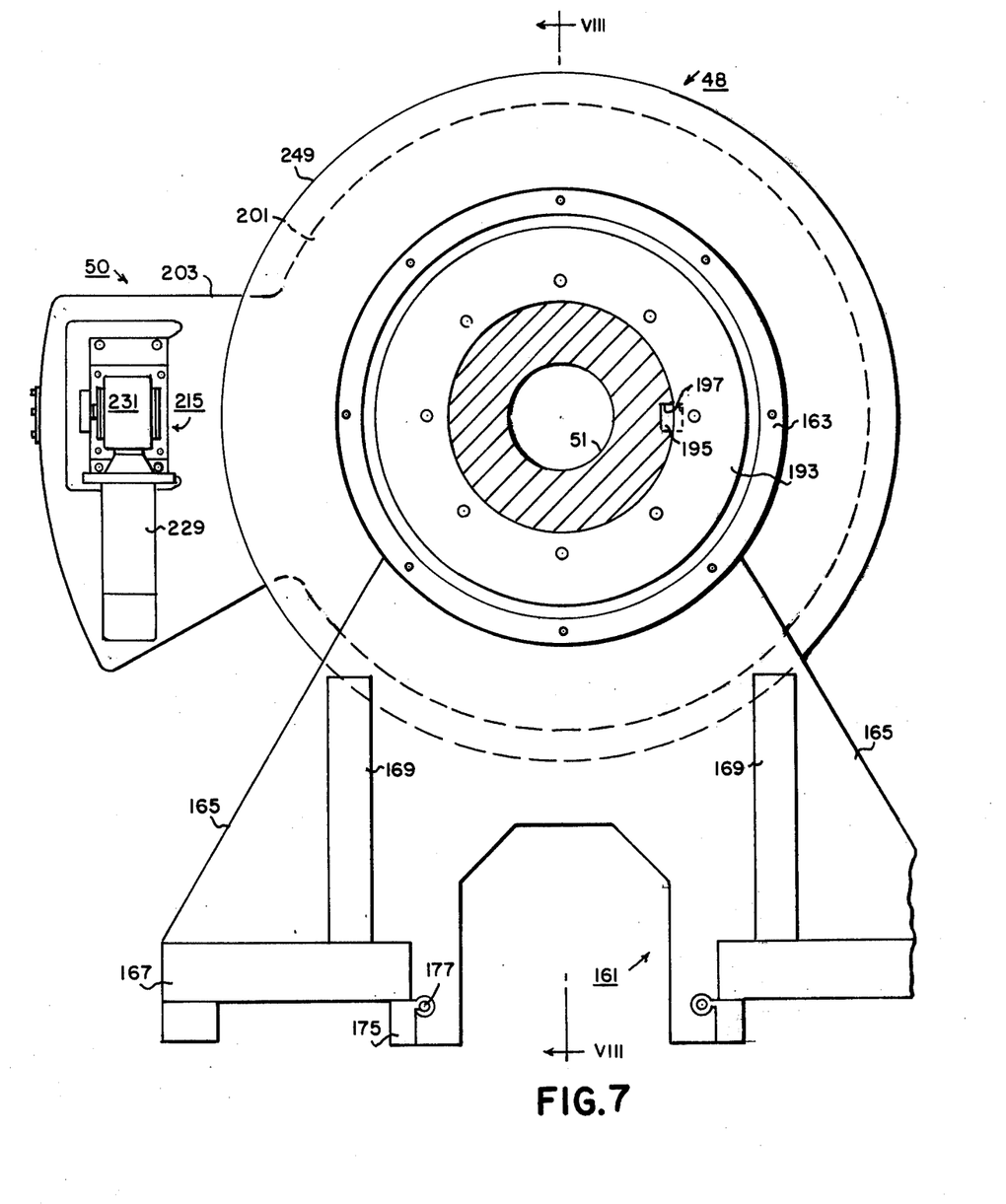
FIG. 7 is a view in end elevation of the fixed bearings for the boring bar taken in the direction of the arrows VII of FIG. 8.

The annular member 163 is provided near its ends with insert rings 181 which support the fixed races 183 of cup bearings 185. The movable races 187 of bearings 185 are positioned by bearing spacer 189. A sleeve bearing support 191 is connected to the races 187 to be rotated therewith. The support 191 carries near its ends sleeve bearings 193, typically of bronze. The sleeve-bearing support has a key 195. To facilitate understanding this key 195 is shown in dash-dot lines (FIG. 8) extending from the support 191. The actual key 195 is shown in full lines along the center line of the sleeve-bearing support 191. The key 195 engages in a slot 197 in the boring bar 51 (FIGS. 7, 9). The boring bar 51 as it rotates, rotates the sleeve-bearing support 191 and the races 187 secured to it through the key 195. The key 195 slides along the slot 197 (FIG. 5).

Each facing head 50 is mounted on a facing plate 201 (FIGS. 7 through 10). The facing plate is annular except for a projection 203 on which the facing head 50 is mounted. The facing plate 201 is secured by bolts 205 to the sleeve-bearing support 191 and is rotatable with the support 191. To assure positive drive of this plate 201, this plate is provided with a key 207 which engages in the keyway 197 of the boring bar 51. In FIG. 7 the facing plate 201 is shown in a position at right angles to its position in FIG. 9.

The facing head 50 includes a tool holder 211, a screw 213 for driving the tool holder radially and a drive 215 for driving the screw 213. The tool holder 211 is of generally rectangular shape and has a pocket or seat 217 for a tool (not shown). The tool is secured in seat 217 by bolts 219. The tool holder 211 has secured thereto a nut 218 which meshes with screw 213. The male portion 220 of a dovetail 224 (FIG. 10) extends integrally from the tool holder 211. The female portion of the dovetail 224 is provided in facing plate 201. A gib 226 (FIG. 10) is interposed on one side between the male and female portions of the dovetail 224.

The screw 213 is rotatable in bearings including bearings 221 and 223 at the inner and outer ends and thrust bearings 227 at the outer end. The drive 215 includes a motor 229 typically of one horsepower. The motor 229 drives the screw through a gear reducer 231 and through a timing belt 233 which interconnects pulleys 235 and 237; 235 on the output shaft of the gear reducer and 237 keyed to the shank of the screw 213 by key 239.

Figure 8:
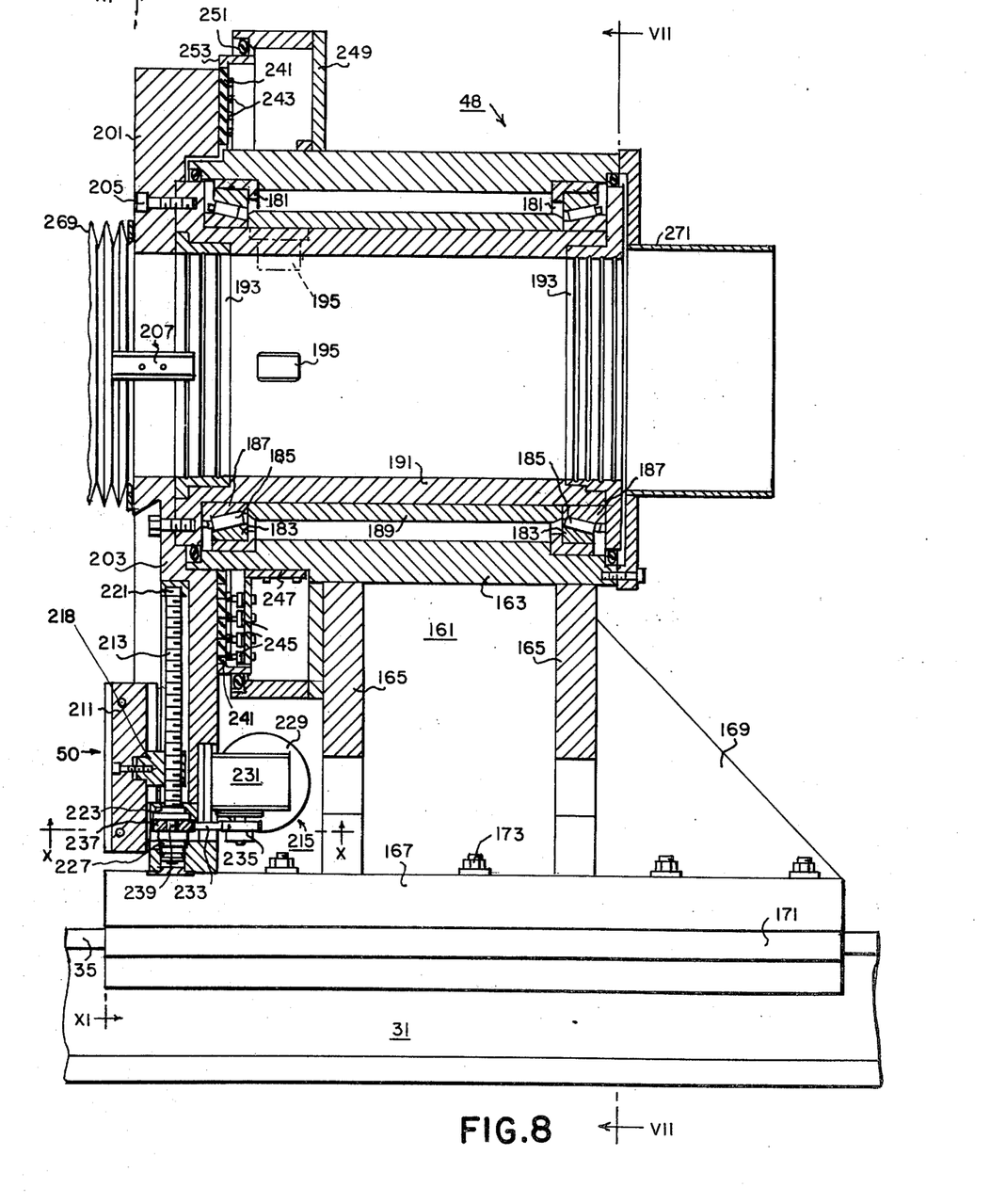
FIG. 8 is a view in section taken along line VIII—VIII of FIG. 7.
Figures 9, 10:
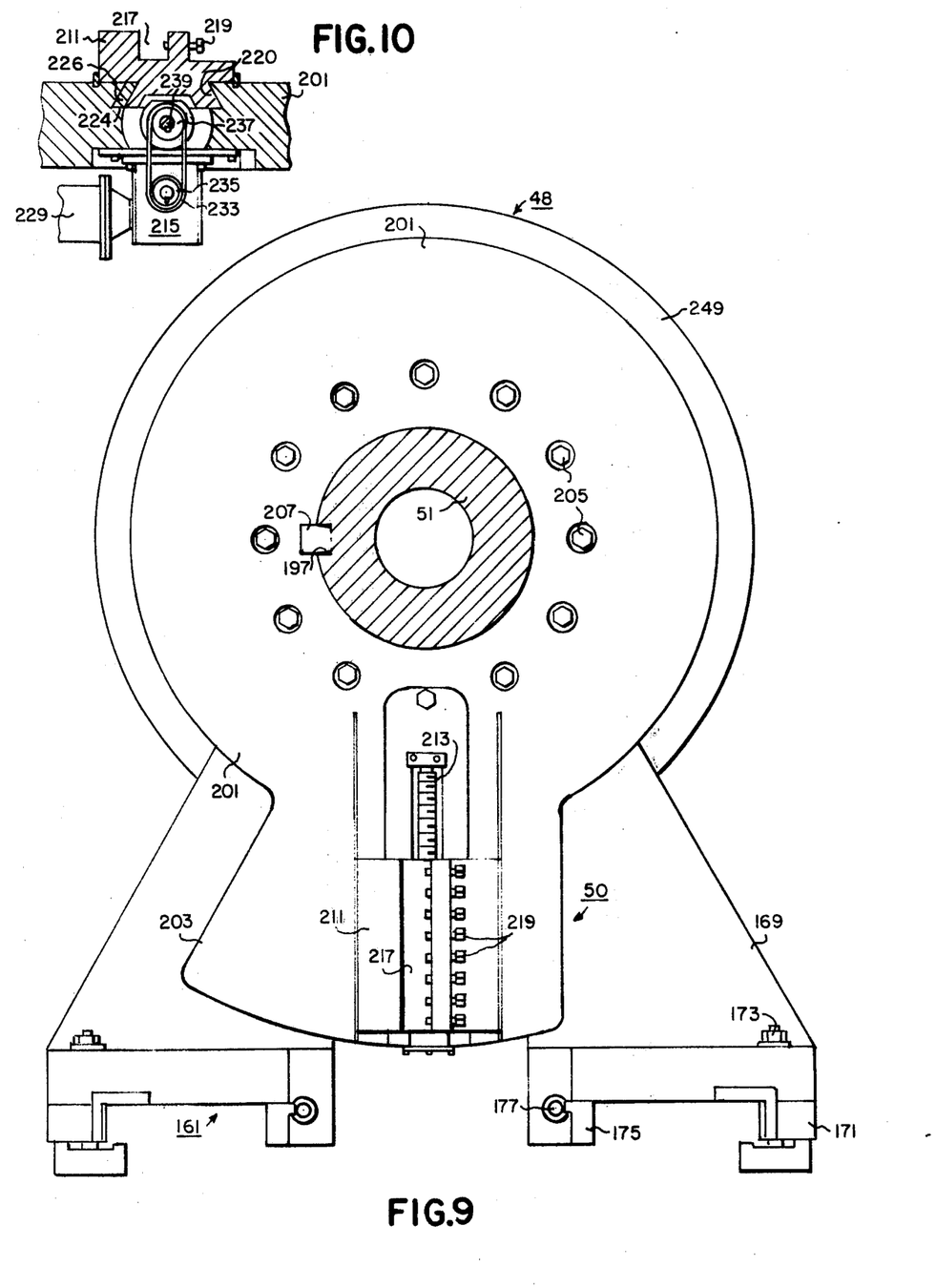
FIG. 9 is a view in end elevation of the fixed bearing shown in FIGS. 7 and 8 taken in the direction of the arrows IX of FIG. 8.
FIG. 10 is a fragmental view taken in the direction of the arrow X of FIG. 8 and, partly in section, showing the track for the facing-tool head.

The projection 203 is displaced axially with respect to the remainder of facing plate 201 (FIG. 8). On the surface opposite to the screw, this plate carries a contact plate 241 with circular contacts 243. These contacts 243 are engaged by brushes 245 on a bracket 247 secured to the annular member 163. The contacts are protected by a shield 249 having a seal 251 interposed between the shield and the opposite face of an annular member 253 extending from the projection 203. Conductors (not shown) from a control are passed into the chamber defined by the shield 249, the seal 251 and the annular member 253 to effect the proper control connections to the motor 229.

A bellows 261 is secured at one end to an annular disk 263 connected to the projection 153 of spindle 155 (FIG. 5), and at the opposite end to a disk 265 (FIG. 1) secured to annular member 163 of the inner (left-hand FIG. 1) bearing unit 48. Another bellows 267 is secured between the facing plate 201 on the inner bearing unit 48 and the inner face of the tool holder 150. A third bellows 269 is secured between the outer face of the tool holder 150 and the facing plate 201 on the outer bearing unit 48. These bellows 261, 267, 269 protect the boring bar from debris. Beyond the outer bearing unit 48, the boring bar is protected by a tube 271 (FIG. 2).

During operation the ways 35 are protected by strips 301 and 303, and 305 and 306 (FIGS. 1 and 2) of stainless steel having aluminum ribs on their bottoms. The strip 301 is spring wound in canister 307 and another canister (not shown) and is unwound from these canisters and extends over a way 35 as the boring-bar unit 45 moves outwardly. Likewise strip 303 is spring wound in canisters 311 and 313 and is unwound as the boring bar unit moves outwardly. Canisters 307 and 311 are mounted on braces 315 and 317 on the bed 31. Canisters 309 and 313 are connected to the head stock 53. Strip 305 is spring wound in canister 319 and at its end is connected to the head stock 53. Strip 306 is spring wound in canister 321 and at its end is connected to the head stock 53. The canisters 319 and 321 are connected to the bearing support 161. In the outward position of the boring-bar unit 45, the strips 305 and 306 are unwound from the canisters 319 and 321. As the boring-bar unit moves inwardly, the strips 305 and 306 are wound into the canisters.

Figure 11:
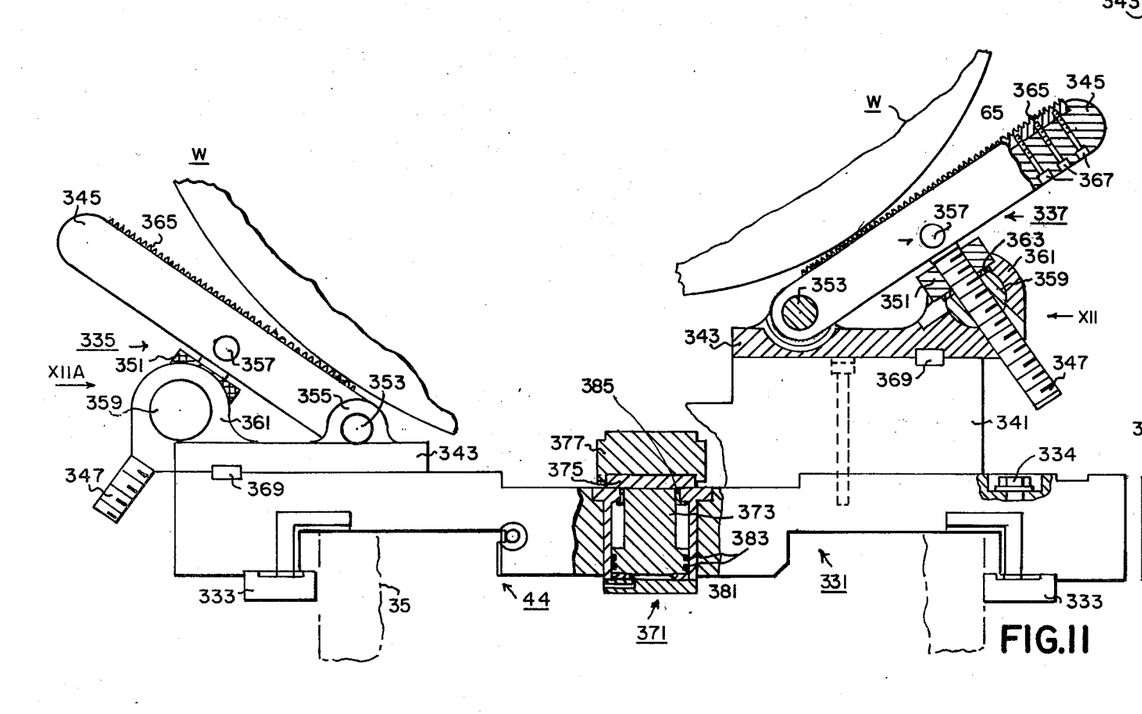
FIG. 11 is a fragmental view, partly in section, showing the mechanism for mounting and securing the work in the practice of this invention.
Figure 12:
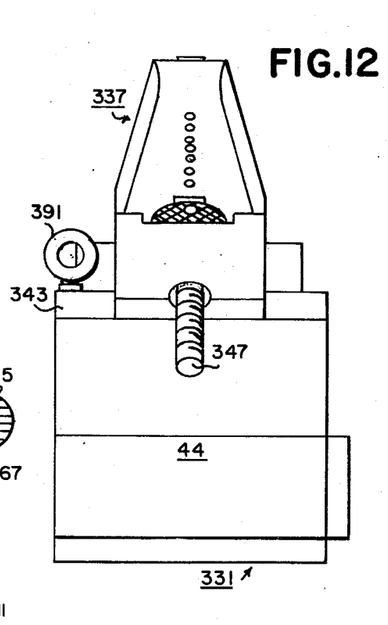
FIG. 12 is a fragmental view in end elevation taken in the direction of the arrow XII of FIG. 11.
Figure 12A:
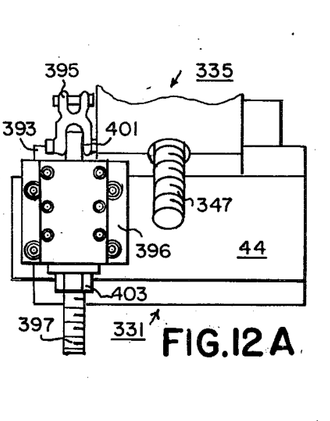
FIG. 12A is a fragmental view in front elevation showing a portion of the mechanism shown in FIG. 11 in the direction of the arrow XIIA of FIG. 11.

The mechanism 44 for holding the work W securely includes a work rest 331 (FIGS. 11, 12, 12A) which is clamped to the ways 35 by clamps 333 secured by clamp bolts 335. Work-engaging assemblies 334 and 337 are mounted on the work rest 331. For work W of large diameter the work-engaging assembly 335 or 337 is mounted directly on the work rest 331, like the assembly 335. For work W of smaller diameter the work-engaging assembly is mounted on a riser 341 bolted to the work rest 331. Each work-engaging assembly 335, 337 includes a block 343, a jack-plate 345 and a jack screw 347 and nut 351 for moving the jack-plate 345. The jack plate 345 is pivoted on a pin hinge 353 in a boss 355 on the block 343. The screw 347 is pivoted on a pin 357 centrally secured to the jack-plate 345. The screw 347 passes through a rod 359 extending through another boss 361 on the block 343. Between the nut 351 and a flat area on rod 359 there is a thrust washer 363. Serrated inserts 365 are secured by bolts 367 in a slot in the jack-plate 345. The block 343 is keyed to the work rest 331, or the riser 341, as the case may be, by key 369.

A cylinder 371 is provided for raising and positioning the work W. The cylinder 371 includes a piston 373 having a cap 375. An anvil 377 is mounted on cap 375. The work W rests on the anvil 377. By introducing fluid in a cavity 379 under the piston 373, the piston 373, anvil 377, and the work W may be raised. The cylinder 371 includes appropriate guides 381, O-rings 383 and bushing 385. The cylinder 371 is necessary because the work is very heavy (up to 50 tons) and the assemblies 335 and 337 are not adequate for raising the work. The cylinder 371 positions the work vertically and the assemblies 335 and 337 position the work horizontally. Once the work is positioned vertically, the assemblies 335 and 337 hold the work in vertical position notwithstanding leakage in the cylinder. In fact once the work is positioned, the piston 373 may be retracted.

An eye-bolt 391 extends from the block 343 of the work-engaging assembly 337. The other work-engaging assembly 335 includes a cooperative structure 393 for securing a chain 395 around the work W. The structure 393 includes a block 396. A chain bar (not shown) of rectangular section from which a screw 397 extends is slideable in the block 396. At its other end the chain block carries a trunion 401 about which the end of the chain 395 is pivotal. A nut 403 meshes with the screw 397. By turning nut 403 so that the screw 397 moves upwardly, the chain 395 is loosened and may be appropriately set over the work W. By reversing the nut 403, the chain 395 may be secured around the work W.

The ball screw 61 of the advancing unit 47 is driven by a motor 411 (FIGS. 3 and 4), typically of about 5 horsepower. The motor 411 drives a stub shaft 413 through a gear-reduction train 415. The motor 411 and train 415 are firmly mounted on a bracket 417 secured to the cross web 39. An aligning coupling 419 connects the screw 61 to the stub shaft 413. The screw 61 is supported by ball bearings 421 and 423 and by the ball nut 59. The bearing 421 is supported on a pillow block 425 mounted on the bracket 417; the bearing 423 is mounted on a pillow block 427 mounted on cross web 39. The screw 61 is protected by bellows 429 between the bearing 421 and ball nut 59 and by bellows 431 between ball-nut 59 and bearing 423.

In the case of the apparatus the work W is mounted and centered and secured by the work supporting mechanism 44. The boring-bar unit 45 is then advanced so that the tools 156 are in cutting engagement with the base of the work. The bearings 48 are also positioned so that the facing tools 50 on each side of the work W are in engagement with the ends of the work W. The boring bar 51 is then rotated and advanced to bore the work. At the same time the facing heads 150, which rotate but do not advance with the boring bar 51, face the ends of work.

In the practice of this invention, a ¼ inch cut was taken in the bore of a cylinder of 4340 heat-treated alloy steel increasing the bore from 40 inches to 40½ inches diameter. The feed of the tools 156 (the advance of the boring bar unit 45) was 0.200 inch per revolution. In work 65 inches in length, the bore was produced with tolerance of ±0.002 inch end to end. Typically, the tool 156 rotates at about 15 revolutions per minute. The tool holder 150 then advances 15 × 0.200 or 3 inches per minute. The time taken to cut a bore in a 65 inch long cylinder is only about 22 minutes. About 650 pounds of metal are cut away.

While a preferred embodiment of this invention is disclosed herein, many modifications thereof are feasible. This invention should not be restricted except insofar as is necessitated by the spirit of the prior art.

I claim:

1. A boring mill for boring work at a high rate, including a bed, means on said bed, for fixedly supporting said work, a massive boring bar, massive cutting-tool means rigidly mounted on said boring bar intermediate the ends thereof, a first drive, connected to said boring bar, for rotating said boring bar and the cutting tool means mounted thereon, bearing means of substantial area connected to said bed for supporting said drive and bar movably along said bed, said bearing means including at least one bearing supported by said bed external of said first drive, and a second drive for advancing said first drive and boring bar along said bed in a direction generally along said boring bar, to advance said cutting-tool means into, and to maintain said cutting-tool means in, cutting engagement with, said work.

2. The boring means of claim 1 wherein the first drive engages the boring bar in driving relationship with an end of said bar and the bearing means includes a first bearing unit near said end of said bar, said first bearing unit being movable with said first drive and said boring bar, a second external bearing unit to be secured to the bed on one side of said work and a third external bearing unit to be secured to said bed on the opposite side of said work, said second and third bearing units when secured being at rest relative to said bar as said bar is moved.

3. The boring mill of claim 2 wherein the first bearing unit is interposed between the first drive and the driven end of the boring bar.

4. The boring mill of claim 3 wherein the boring bar is protected from dirt by a plurality of collapsible bellows, a first bellows between the driven end of the boring bar and the second external bearing unit, a second bellows between the second bearing unit and the cutting-tool means and a third bellows between the cutting-tool means and the third external bearing unit.

5. The boring mill of claim 2 including at least one facing head for facing an end of the work, the said facing head being mounted on one of the external bearing units, and said one bearing unit being capable of being secured to said bed adjustably along said bed for setting said facing head to face the end of the work.

6. The boring mill of claim 5 wherein the facing head is coupled to the boring bar to be rotated thereby as the boring bar is rotated by the first drive.

7. The boring mill of claim 6 wherein the work is coaxial with the boring bar and the facing head includes a facing tool the said boring mill including a third drive for driving said facing tool radially with respect to the work.

8. The boring mill of claim 2 including a plurality of facing heads for facing the ends of the work, a first facing head being mounted on the second external bearing unit in a position to face the end of the work on the one side of the work and a second facing head being mounted on the third external bearing unit in a position to face the end of the work on the opposite side of said work, each of said facing heads having a facing tool and said second and third bearing units being capable of being adjustably secured to the bed along said bed in positions in which the said facing tools are in facing engagement with the work.

9. The boring mill of claim 1 wherein the second drive includes an electric motor, a screw rotatable by said motor, and a nut meshing with said screw and movable along said screw as said screw is rotated, said nut advancing the first drive and bar as it is moved along the screw by rotation of the screw.

10. A generally horizontal boring mill for boring work at a high rate, including a generally horizontal bed, means on said bed for fixedly securing said work to said bed in a position such that the bore when bored will be generally horizontal, a massive boring bar, massive cutting-tool means rigidly mounted on said boring bar intermediate its ends, said cutting-tool means including at least one cutting tool extending radially with respect to said boring bar, a first drive, connected to said boring bar, for rotating said boring bar and the cutting-tool means mounted thereon, bearing means of substantial area connected to said bed for supporting said first drive and bar generally horizontally movably along said bed with said bar generally horizontal, said bearing means including at least one bearing supported by the bed external of the drive, and a second drive for advancing said first drive and boring bar generally horizontally along said bed, to advance said cutting-tool means into, and to maintain said cutting-tool means in, cutting engagement with said work.

11. A boring mill for boring work including a bed, means, of said bed for fixedly supporting said work, a boring bar, cutting-tool means rigidly mounted on said boring bar intermediate the end thereof, a first, drive, connected to said boring bar, for rotating said boring bar and the cutting-tool means mounted thereon, bearing means of substantial area connected to said bed for supporting said drive and bar movably along said bed, said bearing means including at least one bearing supported by said bed external of said drive, and a second drive, for advancing said first drive and boring bar along said bed in a direction generally along said boring bar, to advance said cutting-tool means into, and to maintain said cutting-tool means in, cutting engagement with said work.

12. The boring mill of claim 11 wheren the boring bar is hollow.

13. The boring mill of claim 11 wherein the first drive and boring bar are advanced along the bed by a screw driven by the second drive and connected to the first drive and boring bar through a nut meshing with said screw.

14. The boring mill of claim 13 wherein the screw and nut are a ball screw and a ball nut.

15. The boring mill of claim 11 including at least one facing head, said facing head encircling the boring bar and said boring bar passing through said facing head as said boring bar advances along the head, means securing said facing head to said bed to prevent the advance thereof with said boring bar along said bed, and means connecting said boring bar to said facing head to rotate said facing head as said boring bar is rotated.

16. The boring mill of claim 1 wherein the bearing external of the drive includes at least one facing head for facing an end of the work, and means for securing said bearing to said bed adjustably along said bed for setting said facing head to face said end of said work.

17. The boring mill of claim 1 wherein the bearing external of the drive has mounted thereon at least one facing head including a tool for facing the end of the work, and means connecting said facing head to said boring bar, so that said facing tool is driven through the boring bar in facing engagement with the work.

18. The boring mill of claim 17 wherein the bearing has a movable race and the facing head is connected both to the boring bar and to the movable race of the bearing.

19. The boring mill of claim 17 wherein the work is coaxial with the boring bar and the facing head includes a third drive, connected to the facing tool, for advancing the facing tool radially along the work.

20. A generally horizontal boring mill for boring work at a high rate, including a generally horizontal bed, means on said bed for fixedly securing said work to said bed in a position such that the bore when bored will be generally horizontal, a massive boring bar, massive cutting-tool means rigidly mounted on said boring bar intermediate its ends, said cutting-tool means including at least one cutting tool extending radially with respect to said boring bar, a first drive connected to said boring bar for rotating said boring bar and the cutting-tool means mounted thereon and driving said tool in cutting engagement with said work, bearing means of substantial area supported by said bed external of said first drive for supporting said first drive and bar generally horizontally movably along said bed with said bar generally horizontal, and a second drive for advancing said first drive and boring bar generally horizontally along said bed, with said boring bar and tool supported by said bearing means, to advance said cutting tool means along, and to maintain said cutting-tool means in, cutting engagement with said work, said bearing means having a first bearing for supporting said bar rotatably on said bed and a second bearing for supporting said bar slideably along said bed.

21. A generally horizontal boring mill for boring work at a high rate, including a generally horizontal bed, means on said bed for fixedly securing said work to said bed in a position such that the bore when bored will be generally horizontal, a massive boring bar, massive cutting-tool means rigidly mounted on said boring bar intermediate its ends, said cutting-tool means including at least one cutting tool extending radially with respect to said boring bar, a first drive connected to said boring bar for rotating said boring bar and the cutting-tool means mounted thereon and driving said tool in cutting engagement with said work, bearing means of substantial area supported by said bed external of said first drive for supporting said first drive and bar generally horizontally movably along said bed with said bar generally horizontal, means for securing said bearing means at selectable positions along said bed against movement relative to said bed, a facing head mounted on said bearing means and secured therewith against movement along said bed, said facing head having a facing tool for facing an end of said work, said bearing means being secured so that said facing tool is in facing engagement with said end of said work, means connecting said facing head to said boring bar so that said facing head is rotatable with said boring bar, and a third drive connected to said facing tool for advancing said facing tool radially along said end of said work in facing engagement with said end.

* * * * *